United States Patent [19]

Torok et al.

[11] 4,004,136
[45] Jan. 18, 1977

[54] CREDIT VERIFICATION TERMINAL WITH DUAL INFORMATION SOURCES

[75] Inventors: Gabor Peter Torok, Lincroft; John William Wesner, Jr., Freehold Township, Monmouth County, both of N.J.

[73] Assignee: Bell Telephone Laboratories, Incorporated, Murray Hill, N.J.

[22] Filed: Mar. 24, 1975

[21] Appl. No.: 561,274

[52] U.S. Cl. .............................. 235/61.11 D; 360/2
[51] Int. Cl.² ...................... G06K 7/08; G11B 5/00
[58] Field of Search ................ 235/61.11 D; 360/2, 360/4

[56] References Cited
UNITED STATES PATENTS

| | | | |
|---|---|---|---|
| 3,277,244 | 10/1966 | Frost | 235/61.11 D |
| 3,401,394 | 9/1968 | Leonard | 235/61.11 D |
| 3,752,487 | 8/1973 | de La Celle | 274/4 |
| 3,787,661 | 1/1974 | Moorman | 235/61.11 D |
| 3,803,388 | 4/1974 | Williamson | 235/61.11 D |
| 3,826,900 | 7/1974 | Moellering | 235/61.11 D |
| 3,837,570 | 9/1974 | Ginsburgh | 235/61.11 D |
| 3,891,830 | 6/1975 | Goldman | 235/61.11 D |

*Primary Examiner*—Jay P. Lucas
*Attorney, Agent, or Firm*—Barry H. Freedman

[57] ABSTRACT

A credit verification terminal for use in several credit systems includes a dual purpose mechanism for sequentially propelling a user's credit card past a reading head, and for storing merchant identifying and other data that can be read by the head. In one embodiment, the mechanism comprises an axially movable drum containing coaxial bands of encoded data. As the drum is rotated, a selected band containing merchant data is read; further drum rotational propels a credit card past the head, so that the user data contained thereon is read. In another embodiment, a planar card carrier includes a movable table containing parallel stripes or rows of encoded merchant and other data on one surface thereof. The user's credit card placed on the carrier is propelled past the head in one direction, and the data recorded is read; with the card removed, the merchant data is read when the carrier is moved past the head to its initial position. Apparatus for changing the stored merchant information is described.

17 Claims, 5 Drawing Figures

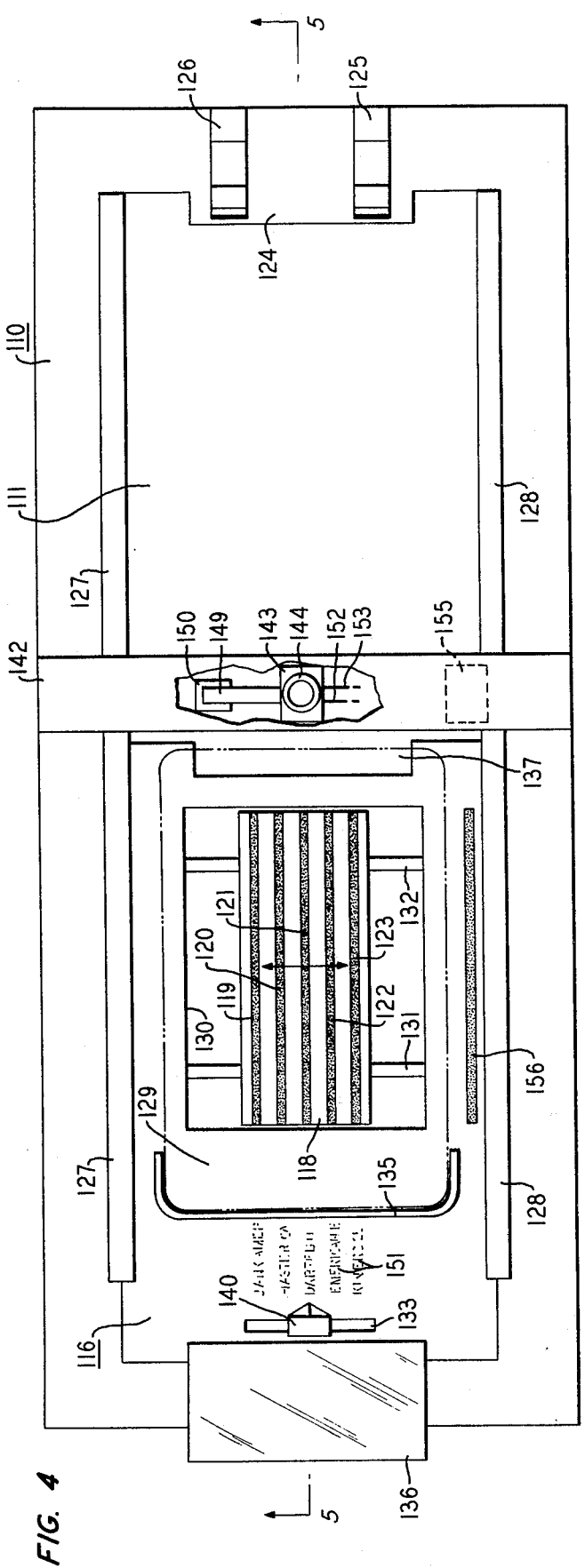
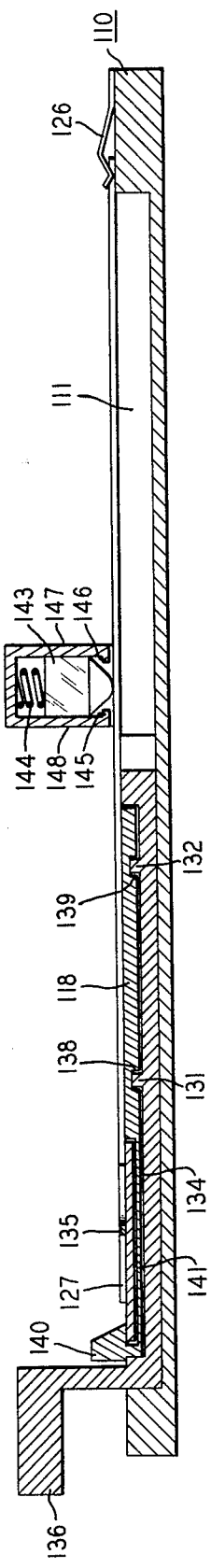
FIG. 4
FIG. 5

CREDIT VERIFICATION TERMINAL WITH DUAL INFORMATION SOURCES

BACKGROUND OF THE INVENTION

1. Field of the Invention

This invention relates generally to communication terminals and more particularly to a credit verification terminal for enabling transmission of data identifying a user of the terminal (customer) and the terminal itself (merchant) to a distant location.

2. Description of the Prior Art

With the increased usage of credit cards in today's cashless society has come a need for quickly and efficiently processing a transaction at the point of sale. Processing, in this connection, generally requires the steps of (1) establishing a communication link with a computer, an attendant, or other facility provided for the purpose by the credit card sponsor, (2) identifying the user or customer, (3) identifying the originator of the transaction, for example, a merchant, (4) communicating the dollar amount of the proposed transaction, and (5) providing an indication at the terminal that the transaction has been approved. Obviously, it is desirable to automate as many of the foregoing steps as possible. To this end, prior art systems have been developed wherein user identification information is encoded optically or magnetically on a stripe contained on the reverse side of a credit card. A similar card containing the telephone number of the authorization facility, and information pertaining to the merchant may also be available, or this data can be stored in a memory within the terminal. In either event, both types of information are transmitted, generally via telephone lines, to the remote location after the initial call is made either manually or automatically a card dialer or the like. The transaction value is then sent via further signalling from an array of push buttons at the terminal, and an authorization to proceed with the transaction or other instructions can be received back either aurally or visually. A complete description of one such terminal is contained in the copending application of V. S. Borison et al, Ser. No. 549,472 now U.S. Pat. No. 3,938,090, filed Feb. 13, 1975 and assigned to the same assignee as the instant application.

While large strides have thus already been made toward automation of the credit verification process, certain difficulties nevertheless remain, primarily in the area of merchant identification. For example, where the merchant data is contained on the magnetic or optically encoded stripe of a credit card, an extra handling step is required of the terminal operator, and the card itself is subject to loss or damage. Where various credit card sponsors are involved, a separate card for each is required, undesirably increasing the possibility of using the wrong card. On the other hand, if the merchant identification is internally stored in a logic memory within the terminal, such memory may be complicated, expensive, and difficult to reprogram, and may also be subject to data loss in the event of power failure.

Based on the foregoing, it is the broad object of the present invention to provide a credit verification terminal capable of efficiently and reliably performing the processing functions enumerated above with a minimum of operator effort, cost and complexity. Additional objects include provision of such a terminal which stores merchant data internally in a manner in which the information is not lost if power fails, yet enables simple changes in the stored data, and which can be used in conjunction with various credit systems without the need for a multiplicity of merchant cards or an unduly large internal logic memory.

SUMMARY OF THE INVENTION

Each of the foregoing and additional objects are achieved in accordance with the principles of the instant invention by a credit verification terminal which includes a reading head and a mechanism serving the dual functions of propelling a credit card past the head so that user identification data encoded thereon is read, and for itself storing merchant identification and other data which can be read by the head. In one embodiment, the mechanism comprises an axially movable drum on the cylindrical surface of which are formed several coaxial bands each containing encoded data for contacting the authorization facility and identifying the merchant. A selected band is aligned with the head, the credit card inserted, and the drum rotated so that the card is propelled past the head and the user data contained thereon is read. Continued rotation of the drum after the card has moved past the head causes the merchant data to be read. In another embodiment, the mechanism comprises a planar card carrier assembly including a movable table on which are formed several parallel bands each containing encoded merchant and other data. To operate the terminal, a selected band is first aligned with the head by moving the table in a direction transverse to the bands. The credit card is then inserted in the carrier so that the card is propelled past the head and the user data contained thereon is read. With the card removed, the merchant data is read when the carrier assembly is moved back past the head to its initial position.

In accordance with another aspect of the invention, useful when the merchant and user data is magnetically encoded, logic circuitry is employed to recognize a unique code contained on a special "data change" card similar in construction to the user's credit card. Upon the detection of this code, the reading head is arranged to alter the merchant data stored in the terminal by operating as a writing head.

By virtue of the unique dual use of a single mechanism to propel the user's card past the reading head and to carry merchant data readable by the head, the construction and operation of the terminal is greatly simplified. Since the merchant data is internal to the terminal, problems associated with a separate merchant card are eliminated. The data contained on the card and on the bands can easily be magnetically or optically encoded, so that information is not lost due to power failure. Additionally, changes in the stored merchant data are readily made.

It is to be noted that the scope and usefulness of the present invention is not limited to credit transactions involving merchants. Rather, the terminal may be put to a variety of uses, by banks and other businesses, to control not only credit, but also inventory, scheduling, etc. In each instance, the invention permits transmission to one or more remote locations of first data stored in the terminal and second data stored on a record medium, and the following detailed description is to be understood accordingly.

BRIEF DESCRIPTION OF THE DRAWING

Numerous other objects, features and advantages of the invention will become more readily apparent from the following detailed description when read in light of the accompanying drawing in which:

FIG. 4 is a top view of the terminal of FIG. 3; and

FIG. 5 is a cross-sectional view of the terminal of FIG. 4 taken along line 5—5.

DETAILED DESCRIPTION

Figure 1:
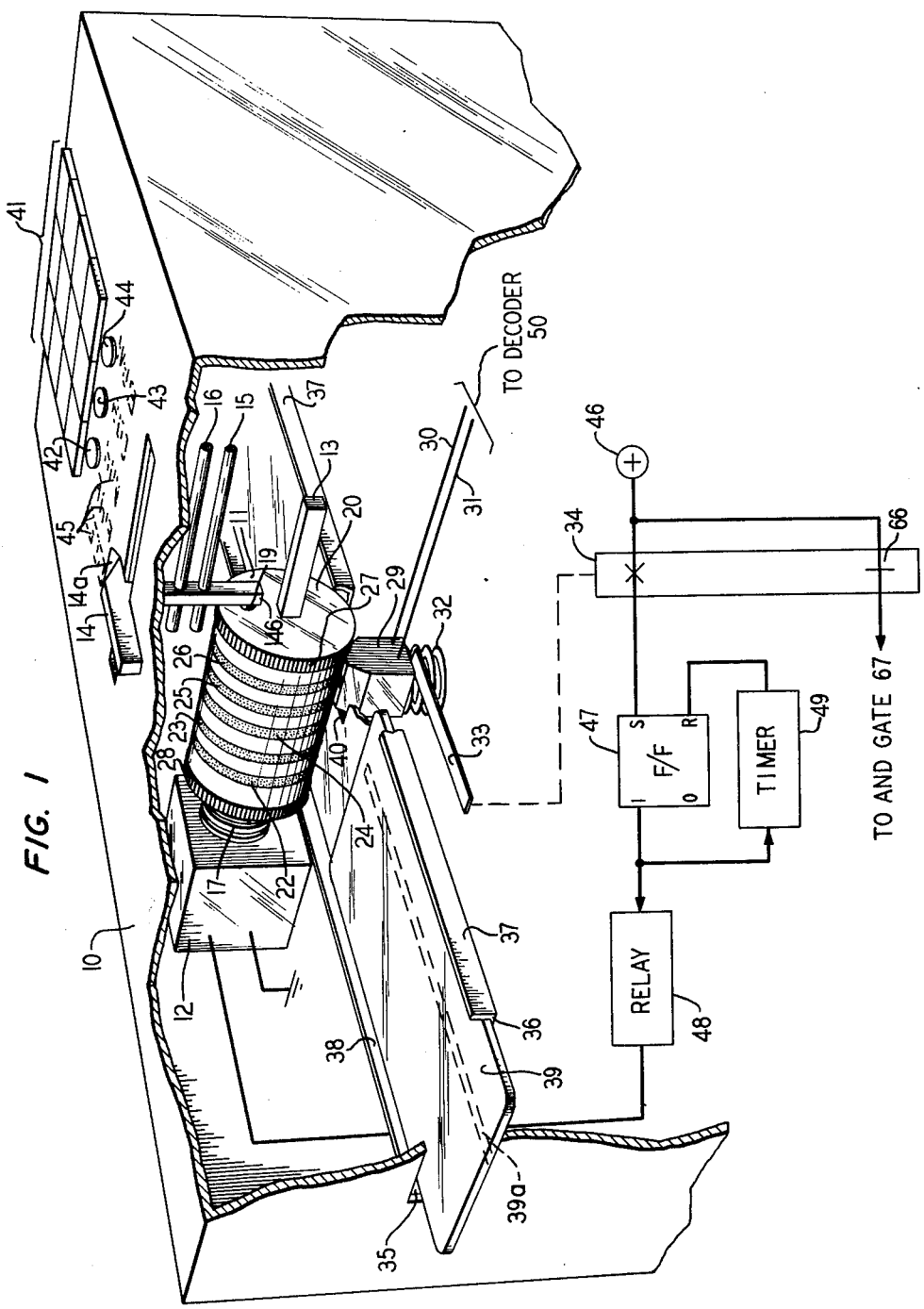
FIG. 1 is a perspective view of one embodiment of a credit verification terminal constructed in accordance with the principles of the invention.

Referring first to FIG. 1, one embodiment of the instant invention includes a housing 10 containing a drum 11 connected to a motor 12 via a shaft 13. The drum is movable axially on the shaft, and is urged in the direction away from motor 12 by a compression spring 17 located between the motor housing and a bearing (not shown) on shaft 13. Drum position is controlled by a selector arm 14 which acts against the pressure of spring 17. Arm 14 slides on and is frictionally held in position by a pair of guide members 15, 16 positioned parallel to the axis of drum 11; the arm includes a pointer portion 14a which protrudes from the top surface of housing 10, and an integral tail portion 14b having a ball bearing 19 which contacts the face 20 of drum 11 opposite to motor 12. A second bearing (not shown) positioned on the distal end of shaft 13, so that drum 11 may rotate freely.

Formed on the cylindrical surface of drum 11 are several coaxial bands 22–26 of encoded data, each containing information identifying the terminal in a particular credit system. For example, band 22 may contain a code associated with and recognizable by remote data processing equipment (or an attendant) provided by the Bank Americard credit network; band 23 may contain similar information relating to the American Express credit system; and the remaining bands 24–26 may correspond to Master Charge, Carte Blanche and Diner's Club sponsored systems, respectively. In addition to terminal identifying data, each band may further include information corresponding to the telephone number to be dialed to gain access to the data processing equipment provided by each credit system sponsor. Accordingly, the term "merchant data" is to be understood to include both types of information, and the terminal may, of course, be used by "merchants" or others. Bands 22–26 are preferably magnetically encoded, readily enabling subsequent changes in stored data; alternatively, the same information may be contained in an optically processable code, as will be understood by those skilled in the art. Also formed on the surface of drum 11, preferably on either side of bands 22–26, are a pair of coaxial bands 27, 28 fabricated from a resilient material such as rubber. As will be described in detail hereinafter, these bands are used to propel a credit card or other record bearing member, and are thus formed with a thickness greater than that of information carrying bands 22–26.

Positioned adjacent to the cylindrical surface of drum 11 is a stationary head 29 which is adapted to transform the data contained in bands 22–26 to an electrical signal on output lines 30,31. Depending upon the type of coding used in bands 22–26, head 29 may be a magnetic read/write head, or an optical sensor. A compression spring 32 or other similar means is arranged to urge head 29 toward the surface of drum 11, and the actuating arm 33 of a switch 34 is connected to head 29, so that displacement thereof may be detected. When switch 34 is closed, a circuit is completed from a power source 46 to the set input of flip-flop 47, the high output of which operates relay 48 and energizes motor 12.

A card guide located transversely of shaft 13 of drum 11 extends from an opening 35 in the front end wall of housing 10 to an opening (now shown) in the rear end wall. The guide is generally U-shaped having a flat bed portion 36 and integral side rails 37, 38, and is dimensioned so as to receive a record bearing medium, for example, credit card 39, and to guide the card between drum 11 and head 29 so that customer data encoded in a band or stripe 39a formed on the card can be read. An aperture 40 formed in bed portion 36 allows communication between the drum and head.

The terminal of FIG. 1 further includes card reader electronic circuitry, a key-board or push-button array 41 for manual data entry, a series of indicator lamps 42–44, and the components of a conventional telephone set. The construction and operation of this portion of the terminal is fully described in the aforementioned copending application of V. S. Borison et al.

Operation of the terminal in the processing of a credit transaction begins by moving pointer portion 14a of selector arm 14 to the appropriate position for the type of credit card presented. For this purpose, various legends may be printed in an area 45 near the pointer on the housing 10, each such legend position corresponding to the position of drum 11 that aligns the appropriate one of bands 22–26 with head 29. Next, user's card 39 is placed in card guide 35, with stripe 39a facing downward, and the card is slid toward head 29 and into initial engagement with bands 27, 28. When the leading card edge contacts the head, the latter is displaced against the pressure of spring 32, and the displacement is detected in arm 33, causing switch 34 to close, setting flip-flop 47, operating relay 48 and energizing motor 12. As revolution of drum 11 begins, card 39 is propelled past head 29 by frictional contact between the card and resilient bands 27, 28; the user data contained in stripe 39a is detected by the head, and appears on output lines 30, 31 for processing as explained hereinafter. After card 39 has been propelled past head 29, drum revolution is continued under the control of timer 49 which is connected to the output of flip-flop 47. The particular one of bands 22–26 aligned with head 29 is thus read, and the merchant and other data stored therein appears on output lines 30, 31. At the end of a timing cycle, the output of timer 49 is applied to reset flip-flop 47 de-energizing relay 48 and stopping motor 12.

Figure 2:
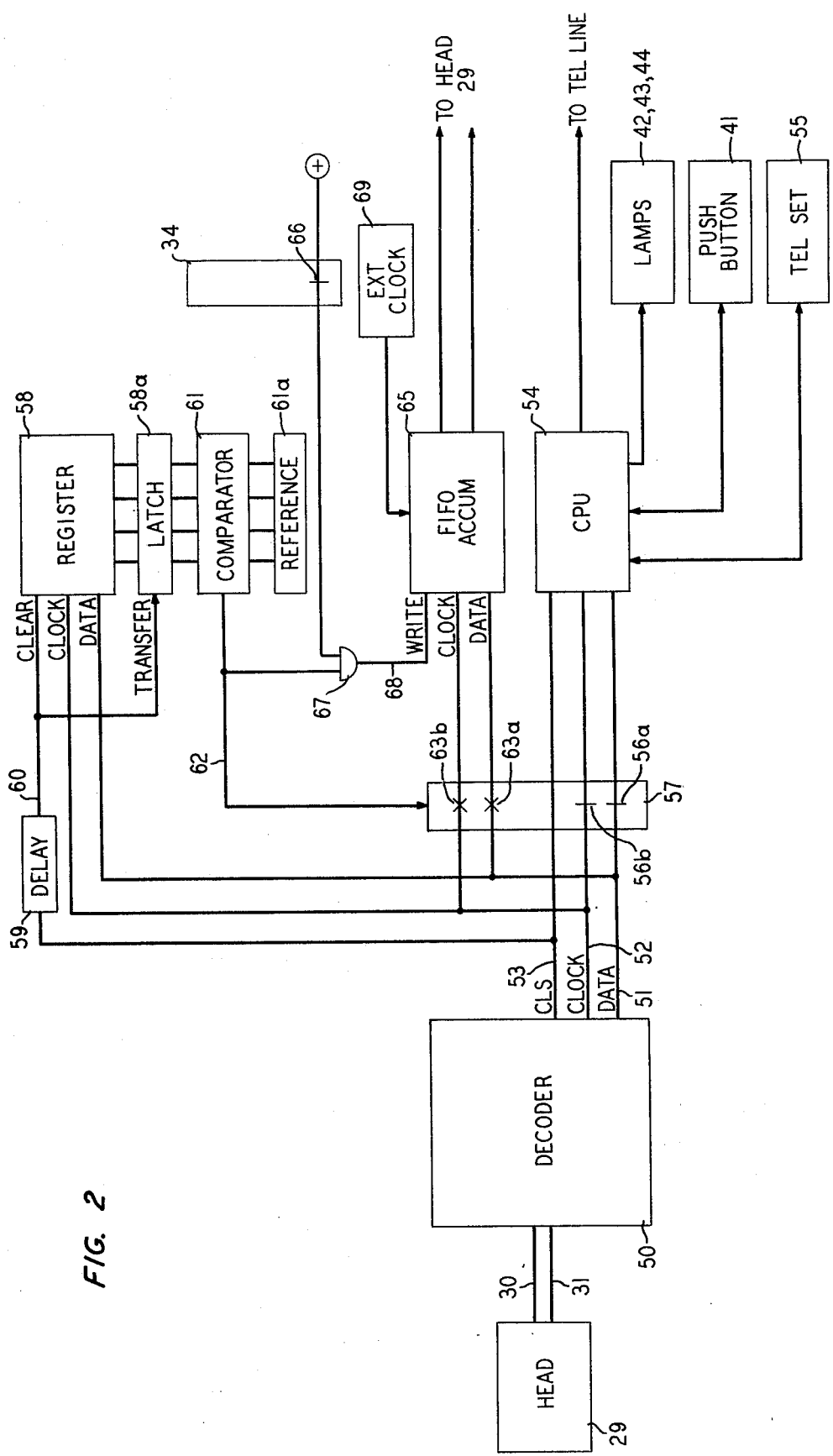
FIG. 2 is a schematic block diagram of the electronic circuitry of a credit verification terminal constructed in accordance with the principles of the invention.

The electronic circuitry used in processing the remainder of the credit transaction is shown in block diagram form in FIG. 2. The output of head 29 on lines 30, 31 is applied to a reader or decoder 50, which may be configured similar to the card reader shown in FIG. 7 of the aforementioned Borison et al application. The purpose of this decoder is to provide, on output lines 51 and 52, data and clock signals, respectively, which represent the stored merchant and user data in a machine processable format and in a manner independent of reading speed. A CLS signal is also supplied on line 53 to indicate the start of the processing sequence, and this signal, along with clock and data, are supplied as inputs to a microprocessor or central processing unit 54 which may be similar to CPU 52 shown in FIGS. 2A-2E of the Borison et al application. The data and clock signals pass from decoder 50 to CPU 54 via normally closed contacts 56a, 56b of switch 57, the purpose of which will become clear hereinafter. As explained in that application in detail, processor 54, which interfaces with pushbutton array 41, lamps 42-44, and includes the components of a telephone set 55, assembles the data received from the head, establishes a communication link over the telephone network to a remote computer or data processing facility, and transmits the customer and merchant data thereto. The transaction amount is then entered via array 41 and is similarly transmitted, and the received signal indicative of the transaction status is displayed visually in lamps 42-44 or audibly over the telephone handset.

In the event that it is desired to change the merchant data stored magnetically in a particular band 21-26 of drum 11, a special card similar to card 39 is prepared for that purpose. The data encoded thereon includes a special preliminary code indicating that stored merchant data is to be changed, followed by the new data to be stored on the drum. The change procedure is initiated by aligning the appropriate band with head 29 by movement of selector arm 14, and insertion of the special card in guide 35. When the card is moved into contact with head 29, drum rotation begins, and the card data is read and applied to decoder 50. The data and clock outputs 51, 52 thereof are connected to a shift register 58, which continues to receive the data until sufficient time has elapsed during which the special preliminary code is read. Timing is effected by delay circuit 59, which starts timing at the beginning of a decoding cycle in the presence of a CLS signal on line 53, and produces a high output on line 60 at the appropriate time, transferring the contents of register 58 to a latch 58a, and clearing register 58 for future operation. Comparator 61, which may be of conventional construction, is arranged to compare the contents of latch 58a with the aforementioned special preliminary code stored in reference 61a and to produce and maintain a high output on line 62 in the presence of a positive comparison. This signal acts to open contacts 56a and 56b of switch 57, and to close contacts 63a and 63b thereof, routing further data and clock signals on lines 51 and 52 to an accumulator 65 rather than CPU 54. Thus, the remainder of the data on the special card, which represents the new merchant information to be written on the drum, is sequentially read into and stored in accumulator 65 as the card continues to be propelled past head 29.

After the special card clears head 29, normally closed contacts 66 of switch 34 again close, (having been open during card reading) supplying one high input to AND gate 67. The other input to AND gate 67, supplied from the output of comparator 61 is then also high, so that the high gate output connected to the write terminal 68 of accumulator 65, causes the latter to transmit the stored new merchant information to head 29, now acting as a writing head, at a rate controlled by external clock 69. Accordingly, the new merchant code is written onto the particular one of bands 21-26 aligned with head 29, to replace the preexisting stored merchant code. As described previously, the end of the operating cycle occurs when timer 49 resets flip-flop 47, opening relay 48 and stopping motor 12.

After the merchant data has been changed, further operation of the terminal is as stated hereinabove. Namely, in the absence of the special preliminary code, the output of comparator 61 remains low, switch 57 is not operated, and all data and clock signals from decoder 50 are routed to CPU 54 rather than accumulator 65.

Figure 3:
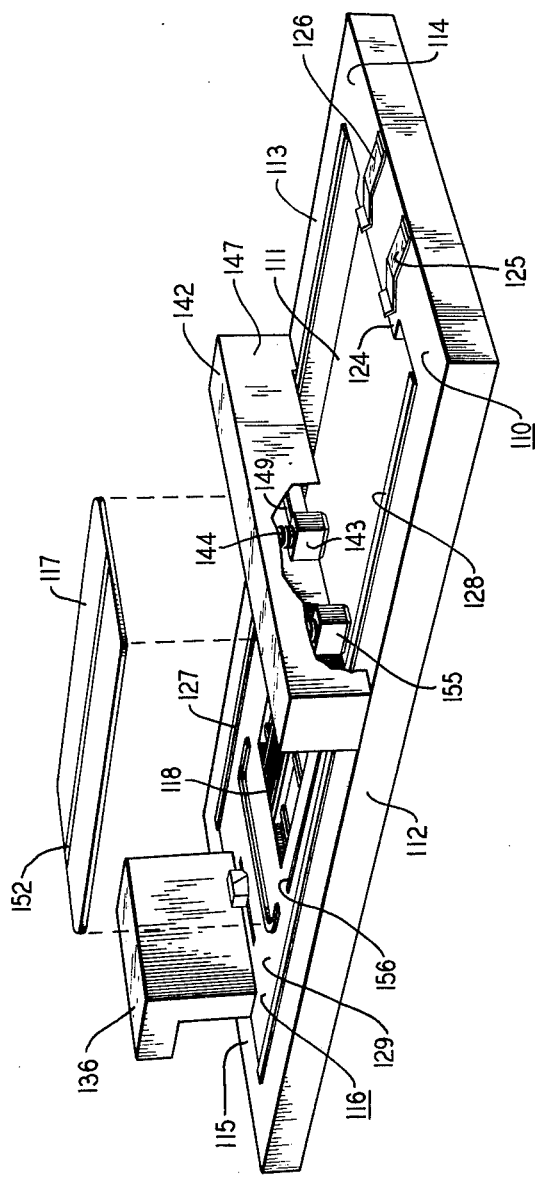
FIG. 3 is a perspective view of another embodiment of a credit verification terminal constructed in accordance with the principles of the present invention.

Referring now to FIGS. 3-5, wherein like elements are similarly numbered, another emodiment of the instant invention includes a base 110 having a generally flat central section or trough 111 surrounded by integral sidewalls 112, 113 and end walls, 114, 115. End wall 114 includes a rectangular section 124 which extends into through 111, and a pair of card retaining clips 125, 126. Positioned within trough 111 and longitudinally slidable therein is a planar card carrying mechanism 116, which is adapted to receive a record bearing medium such as credit card 117, and which also includes a transversely movable table 118 on which are formed several parallel rows or bands 119-123. Like bands 22-26 of FIG. 1, bands 119-123 may be magnetically encodable material deposited on or otherwise affixed to the surface of table 118, or may be optically encoded. In either event, the bands contain encoded merchant data used in various credit systems. Side-walls 112, 113 include longitudinal retaining tracks 127, 128 which hold mechanism 116 within trough 111. Mechanism 116 includes a bed 129 having a rectangular depression 130, raised transversely extending guide members 131, 132 formed within depression 130, and a transverse slot 133 formed in the bed and extending to the end of a tunnel 134 which provides communication between the slot 133 and the depression 130. An indexing member 135 is formed on the surface of bed 129 and allows proper positioning of the card 117; an integral handle 136 formed at one end of the bed provides for convenient movement of mechanism 116 in trough 111. A rectangular cutout 137 is formed in the proximal end of bed 129 so that when the card is properly positioned, its leading edge extends beyond and covers the rectangular cutout. Table 118 includes transverse guide slots 138, 139 on the underside thereof which receive guide members 131, 132, respectively; a selecting member 140 movable within slot 133 is connected to table 118 by an arm 141 movable within tunnel 134. Thus, movement of member 140 results in movement of table 118 in a direction transverse to the longitudinal axis of mechanism 116.

A bridge like member 142 containing a stationary reading head 143 is affixed to side-walls 112, 113 and extends across trough 111. Head 143, which is magnetic or optical in accordance with the type of encoded data being read, is centrally located in bridge 142 and urged toward mechanism 116 by a biasing spring 144. Downward movement of head 143 is limited by tabs 145, 146 affixed to side-walls 147, 148 of bridge 142, and upward movement of the head, in the presence of a card being read, is detected by a switch 149 activated by lever arm 150 connected to the head.

Operation of the terminal of FIGS. 3-5 begins by positioning table 118 to align the appropriate one of bands 119-123 with head 143; positioning is accomplished by aligning selecting member 140 with the appropriate one of a number of legends formed in an area 151 of mechanism 116, depending upon the credit system involved in the transaction being processed.

After table alignment, card 117 is inserted on bed 129 against indexing member 135, with the encoded user data in band 152 of the card facing up. Handle 136 is then used to longitudinally move mechanism 116 in trough 111, so that the user data in band 152 is read by head 143 and transmitted to decoder 50 via leads 153, 154. During passage of card 117 past head 143, the latter is deflected against spring 144, and head movement is detected in arm 149, opening switch 150. When mechanism 116 reaches the limit of its travel, rectangular section 124 is received in cutout 137, and the leading edge of card 117 passes under and is retained by clips 125, 126.

The reading cycle is completed by returning mechanism 116 to its initial position. In so doing, table 118 is then exposed or uncovered so that the particular one of bands 119–123 aligned with head 123 is read thereby, and the merchant data contained therein is transmitted to decoder 50 via head outputs 153, 154. Card 117 may be returned to the user by removing it manually from clips 125, 126.

The remainder of the credit verification sequence using the terminal of FIGS. 3–5 proceeds in the same manner as the sequence described previously in connection with the apparatus of FIG. 1. Namely, the merchant and user identification data supplied to CPU 50 of FIG. 2 is used to establish a communication link with a remote data processing facility provided by the sponsor of the credit system involved in the transaction, and the identification data is transmitted thereto, together with manually entered data indicative of the transaction value. After processing at the remote location, authorization to proceed or other instructions are received at the terminal audibly or visually.

Merchant data contained in bands 119–123 may be changed using a procedure generally similar to that used in conjunction with the terminal of FIG. 1. However, since mechanism 116 is driven by hand, means for synchronizing its position with the readout of data from accumulator 65 of FIG. 2 are required. For this purpose, an auxiliary reading head 155 is provided in bridge 142, positioned over a timing track 156 formed on the surface of bed 129 of mechanism 116. The output of head 155 is applied to accumulator 65 in FIG. 2 in lieu of external clock 69, so that the new merchant code written on the band to be changed is timed appropriately. In addition, since the read and write directions of travel of mechanism 116 are opposite to each other, the new merchant data is assembled on the special charge card in reverse sequence; alternatively, first in-first out accumulator 69 of FIG. 2 may be replaced by a first inlast out accumulator. As before, writing is accomplished only when both inputs to AND gate 67 are high, i.e., when comparator 61 has detected the presence of the special preliminary code and when switch 150, which is connected to the other AND gate input in lieu of switch 34 of FIG. 2, is closed after the card has cleared head 143.

Based upon the foregoing, it will be seen that a terminal constructed in accordance with the principles of the present invention quickly and efficiently processes a credit transaction by advantageously incorporating a single mechanism serving the dual functions of propelling a user's credit card past a reading head, and itself carrying merchant data which is readable by the head. In the embodiment of FIG. 1, the mechanism is a drum containing coaxial bands of encoded data and resilient bands for propelling the card; in the embodiment of FIGS. 3–5, the mechanism is a planar card carrier assembly including a movable table on the surface of which are formed parallel bands of encoded merchant data. In both instances, as the record medium is moved between the head and the area of the mechanism containing the merchant data, reading of the latter is precluded. Apparatus for changing magnetically stored merchant data, using the same simple operational sequence used in other transactions, is provided in both embodiments.

Various modifications and adaptations of this invention may be made by those skilled in the art. For this reason, it is intended that the invention be limited only by the appended claims. For example, in the embodiment of FIG. 1, if it is desired to read the merchant data before reading the user data, bands 21–26 may be arranged to extend only partially around the circumference of drum 11, with resilient bands 28, 29 extending around the remaining portion of the drum surface. Upon insertion of a card in the apparatus, drum revolution and merchant data reading thus begin, and continue until the resilient bands engage and propel the card past the head, then reading the user data. In another variation, the circumference of drum 11 may be chosen to be equal to the length of user card 39. In this event, a simple mechanical clutch arrangement may be used to provide a two revolution motor, and flip-flop 47 and timer 49 are thus not required.

What is claimed is:

1. A credit verification terminal for providing, sequentially, information identifying a user of said terminal by a user code contained on a record medium and information identifying said terminal by a merchant code stored in said terminal, comprising:
    a head for reading said merchant and user codes when moved past said head, and
    dual purpose means for a) storing said merchant code in an area thereof and adapted to move said area containing said code past said head, whereby said merchant code is read, and b) moving said record medium between said head and said area, whereby said user code is read and reading of said merchant code is precluded.

2. The invention defined in claim 1 wherein said dual purpose means includes a drum rotatable around a longitudinal axis,
    said area includes at least one band formed on the cylindrical surface of said drum,
    said record medium moving means includes a band of resilient material on said cylindrical surface of said drum adapted to propel said record medium when said drum is rotated, and
    wherein said terminal further includes means responsive to the positioning of said record medium at a predetermined location for rotating said drum.

3. The invention defined in claim 2 further including means for axially positioning said drum so that a particular one of said at least one bands on said surface is aligned with said head.

4. The invention defined in claim 3 wherein said terminal further includes means for recognizing a record medium containing a new merchant code to be stored in a particular one of said at least one bands, and means including said head for writing said new merchant code onto said particular one of said at least one bands.

5. The invention defined in claim 4 wherein the circumference of said drum is equal to the length of said record medium, and
said rotating means is arranged to rotate said drum for two revolutions.

6. The invention defined in claim 1 wherein said dual purpose means includes a planar carrier having a longitudinal axis and a movable table formed on said carrier,
said area includes at least one band formed on said table parallel to said axis,
said record moving means includes first means for positioning said record medium on said carrier atop said table and second means for moving said carrier along said longitudinal axis from an initial position to a second position and back to said initial position, and
said terminal further includes means for removing said record medium from said carrier upon reaching said second position, whereby said user code is read by said head when said carrier is moved from said first position to said second position and said merchant code is read by said head when said carrier is moved from said second position back to said first position.

7. The invention defined in claim 6 further including means for aligning a particular one of said at least one bands on said table with said head by movement of said table transverse to said longitudinal axis.

8. The invention defined in claim 7 further including means for recognizing a record medium containing a new merchant code to be stored in a particular one of said at least one bands, and
means including said head for writing said new merchant code onto said particular one of said at least one bands.

9. The invention defined in claim 8 further including timing means for synchronizing said writing means with said moving means, said timing means including a timing track positioned on said carrier and a timing head adapted to read said timing track.

10. A communication terminal for reading sequentially first encoded data contained on a record medium and second encoded data stored in said terminal, comprising
a head adapted to read said first and second data when moved past said head, and
means movable relative to said head for storing said second encoded data,
wherein said movable means is adapted to move said second encoded data past said head in the absence of said record medium, whereby said second data is read, and to move said record medium past said head, whereby said first data is read.

11. Apparatus for transmitting to a remote location first encoded data stored on a record medium, said data indicative of a customer making a transaction, and second encoded data including data indicative of a merchant making said transaction, including
first means for storing in said apparatus said second data in a form readable by a head,
a stationary head adapted to read said second data and said first data, and
second means for causing said head to sequentially read said second data stored in said first means and said first data stored on said record medium.

12. The invention defined in claim 11 wherein
said first means includes a drum having a cylindrical surface, a longitudinal axis, and a plurality of coaxial bands of said second data on said surface, and
said second means includes means for aligning a particular one of said bands with said head for reading by said head when said drum is rotated to move said particular band past said head, means for propelling said record medium past said head for reading of said first data when said drum is rotated, and means for rotating said drum to propel said record medium past said head and to move said particular band past said head.

13. The invention defined in claim 12 wherein said head is adapted to read magnetically encoded data, said terminal includes means for transmitting said encoded data to a plurality of remote locations, and
each of said plurality of coaxial bands includes magnetically encoded data corresponding to a particular one of said plurality of remote locations.

14. The invention defined in claim 12 wherein said propelling means includes at least one band of resilient material formed on said cylindrical surface of said drum.

15. The invention defined in claim 11 wherein
said first means includes a planar carrier, a movable table formed on said carrier and a plurality of parallel bands of said second data on said table, and
said second means includes means for aligning a particular one of said bands with said head for reading by said head when said carrier is moved past said head in a first direction, meand for positioning said record medium on said carrier for reading of said first data by said head when said carrier is moved past said head in a second direction opposite to said first direction, and means for moving said carrier in said first and second directions.

16. The invention defined in claim 15 wherein said head is adapted to read magnetically encoded data, said terminal includes means for transmitting said encoded data to a plurality of remote locations, and
each of said plurality of parallel bands includes magnetically encoded data corresponding to a particular one of said plurality of remote locations.

17. The invention defined in claim 15 wherein said terminal further includes means for recognizing a record medium containing new second data to be stored in a particular one of said at least one bands, and
means including said head for writing said new second data onto said particular one of said bands.

* * * * *